US012340020B2

(12) United States Patent
Chen

(10) Patent No.: US 12,340,020 B2
(45) Date of Patent: Jun. 24, 2025

(54) ELECTRONIC APPARATUS AND METHOD OF OPERATION ELECTRONIC APPARATUS

(71) Applicants: Beijing BOE Technology Development Co., Ltd., Beijing (CN); BOE Technology Group Co., Ltd., Beijing (CN)

(72) Inventor: Yuju Chen, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/904,996

(22) PCT Filed: Dec. 1, 2021

(86) PCT No.: PCT/CN2021/134777
§ 371 (c)(1),
(2) Date: Jun. 8, 2023

(87) PCT Pub. No.: WO2023/097557
PCT Pub. Date: Jun. 8, 2023

(65) Prior Publication Data
US 2024/0220017 A1    Jul. 4, 2024

(51) Int. Cl.
*G06F 3/01* (2006.01)
*G06F 3/044* (2006.01)

(52) U.S. Cl.
CPC ............ *G06F 3/016* (2013.01); *G06F 3/0445* (2019.05); *G06F 2203/014* (2013.01)

(58) Field of Classification Search
CPC ... G06F 3/016; G06F 3/0445; G06F 2203/014
See application file for complete search history.

(56) References Cited

U.S. PATENT DOCUMENTS

| 2008/0024459 A1 | 1/2008 | Poupyrev et al. |
| 2010/0141606 A1* | 6/2010 | Bae .......................... G06F 3/016 345/173 |

(Continued)

FOREIGN PATENT DOCUMENTS

| CA | 2731042 A1 | 1/2010 |
| CN | 103034326 A | 4/2013 |

(Continued)

OTHER PUBLICATIONS

Gholamreza et al., Creating Multi-touch Haptic Feedback on an Electrostatic Tactile Display, Mar. 1, 2018, IEEE Haptic Symposium, pp. 163-168 (Year: 2018).*

(Continued)

*Primary Examiner* — Tam T Tran
(74) *Attorney, Agent, or Firm* — Intellectual Valley Law, P.C.

(57) ABSTRACT

An electronic apparatus is provided. The electronic apparatus includes a touch control device configured to detect a position of a touch on a surface of the electronic apparatus; a haptic device configured to produce a vibration pattern on the surface; a driving circuit configured to drive the haptic device; and a processor configured to determine in real time a relative position between the touch and a boundary zone of a virtual object, and upon determination that the position of the touch enters the boundary zone, transmit a first driving signal to the driving circuit. Upon receiving the first driving signal, the driving circuit is configured to drive the haptic device to produce a first vibration pattern having characteristics that simulate a boundary of the virtual object.

18 Claims, 14 Drawing Sheets

(56) References Cited

U.S. PATENT DOCUMENTS

| | | |
|---|---|---|
| 2011/0163985 A1 | 7/2011 | Bae et al. |
| 2012/0229407 A1 | 9/2012 | Harris et al. |
| 2013/0088439 A1 | 4/2013 | Shih et al. |
| 2014/0247227 A1* | 9/2014 | Jiang .................... H10N 30/204 345/173 |
| 2015/0153830 A1 | 6/2015 | Hirose et al. |
| 2018/0039331 A1 | 2/2018 | Warren |
| 2018/0314401 A1 | 11/2018 | Endo et al. |
| 2020/0184785 A1* | 6/2020 | Khoshkava ............ G06F 1/1652 |
| 2023/0185378 A1* | 6/2023 | Chen .................. G06F 3/04886 345/173 |

FOREIGN PATENT DOCUMENTS

| | | |
|---|---|---|
| CN | 104395866 A | 3/2015 |
| CN | 104777947 A | 7/2015 |
| CN | 109240485 A | 1/2019 |
| CN | 110362200 A | 10/2019 |
| EP | 2406702 B1 | 3/2019 |
| WO | WO-2010009552 A1 * | 1/2010 ......... G06F 15/0225 |

OTHER PUBLICATIONS

Lynette A. Jones et al., Localization and Pattern Recognition with Tactile Displays, Mar. 1, 2008, IEEE Symposium on Haptic Interfaces for Virtual Environment and Teleoperator Systems, pp. 33-39 (Year: 2008).*

International Search Report & Written Opinion mailed Aug. 25, 2022, regarding PCT/CN2021/134777.

The Extended European Search Report in the European Patent Application No. 21965994.3, dated Jun. 7, 2024.

* cited by examiner

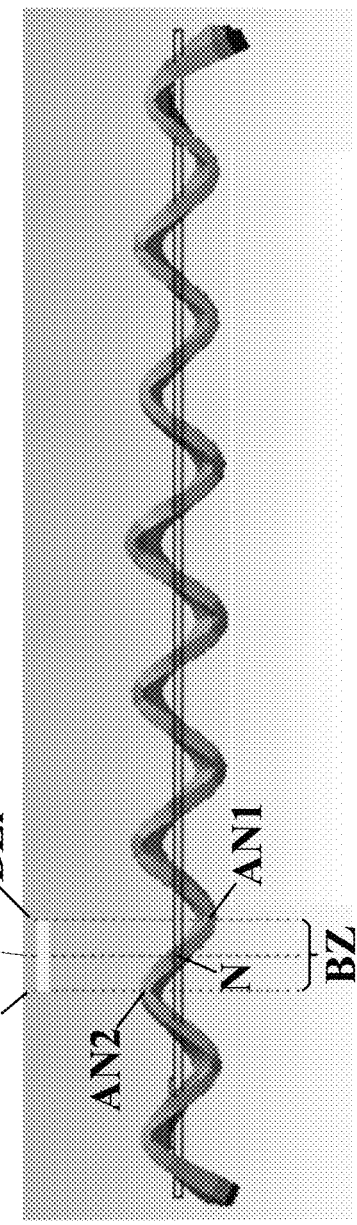

ELECTRONIC APPARATUS AND METHOD OF OPERATION ELECTRONIC APPARATUS

CROSS-REFERENCE TO RELATED APPLICATION

This application is a national stage application under 35 U.S.C. § 371 of International Application No. PCT/CN2021/134777, filed Dec. 1, 2021, the contents of which are incorporated by reference in the entirety.

TECHNICAL FIELD

The present invention relates to haptic technology, more particularly, to an electronic apparatus and a method of operating an electronic apparatus.

BACKGROUND

Haptic technology enables device-human interaction. Haptic technology may be classified into two categories, including vibration feedback, and haptic reproduction. Haptic reproduction technology enables perception of characteristics of an object through a touch, achieving highly efficient and natural interaction in a multi-media environment.

SUMMARY

In one aspect, the present disclosure provides an electronic apparatus, comprising a touch control device configured to detect a position of a touch on a surface of the electronic apparatus; a haptic device configured to produce a vibration pattern on the surface; a driving circuit configured to drive the haptic device; and a processor configured to determine in real time a relative position between the touch and a boundary zone of a virtual object, and upon determination that the position of the touch enters the boundary zone, transmit a first driving signal to the driving circuit; wherein, upon receiving the first driving signal, the driving circuit is configured to drive the haptic device to produce a first vibration pattern having characteristics that simulate a boundary of the virtual object.

Optionally, two adjacent anti-nodes of the first vibration pattern substantially overlap with an inner boundary line and an outer boundary line of the boundary zone, respectively.

Optionally, the first vibration pattern further includes a node immediately adjacent to the two adjacent anti-nodes; and the two adjacent anti-nodes have a phase difference of 180 degrees.

Optionally, the first vibration pattern has a coefficient of friction at the node greater than coefficients of friction at the two adjacent anti-nodes.

Optionally, upon determination that the position of the touch exits the boundary zone and enters an activatable zone of the virtual object, the processor is configured to transmit a second driving signal to the driving circuit; and upon receiving the second driving signal, the driving circuit is configured to drive the haptic device to produce a second vibration pattern different from the first vibration pattern.

Optionally, the second vibration pattern has a frequency higher than a frequency of the first vibration pattern.

Optionally, the electronic apparatus further comprises a display panel configured to display an object image representing the virtual object, the object image having a displayed boundary zone; wherein the processor is further configured to determine in real time a sliding speed of the touch on the surface, and determining a distance between two adjacent anti-nodes of the first vibration pattern based on the sliding speed and a distance between an inner boundary line and an outer boundary line of the displayed boundary zone.

Optionally, the distance between two adjacent anti-nodes of the first vibration pattern is greater than the distance between an inner boundary line and an outer boundary line of the displayed boundary zone.

Optionally, the first vibration pattern is not localized in a region of the boundary of the virtual object.

Optionally, the haptic device comprises a plurality of units arranged along a first direction; and a respective unit of the plurality of units comprises a first electrode layer, an electroactive layer on the first electrode layer, and a second electrode layer on a side of the electroactive layer away from the first electrode layer.

In another aspect, the present disclosure provides a method of operating an electronic apparatus, comprising detecting a position of a touch on a surface of the electronic apparatus; producing, by a haptic device, a vibration pattern on the surface; determining in real time a relative position between the touch and a boundary zone of a virtual object; determining that the position of the touch enters the boundary zone; transmitting a first driving signal to a driving circuit; and upon receiving the first driving signal by the driving circuit, driving a haptic device to produce a first vibration pattern on the surface, the first vibration pattern having characteristics that simulate a boundary of the virtual object.

Optionally, two adjacent anti-nodes of the first vibration pattern substantially overlap with an inner boundary line and an outer boundary line of the boundary zone, respectively.

Optionally, the first vibration pattern further includes a node immediately adjacent to the two adjacent anti-nodes; and the two adjacent anti-nodes have a phase difference of 180 degrees.

Optionally, the first vibration pattern has a coefficient of friction at the node greater than coefficients of friction at the two adjacent anti-nodes.

Optionally, the method further comprises determining that the position of the touch exits the boundary zone and enters an activatable zone of the virtual object; transmitting a second driving signal to the driving circuit; and driving the haptic device to produce a second vibration pattern different from the first vibration pattern.

Optionally, the second vibration pattern has a frequency higher than a frequency of the first vibration pattern.

Optionally, the method further comprises displaying an object image representing the virtual object, the object image having a displayed boundary zone; determining in real time a sliding speed of the touch on the surface; and determining a distance between two adjacent anti-nodes of the first vibration pattern based on the sliding speed and a distance between an inner boundary line and an outer boundary line of the displayed boundary zone.

Optionally, the distance between two adjacent anti-nodes of the first vibration pattern is greater than the distance between an inner boundary line and an outer boundary line of the displayed boundary zone.

Optionally, the first vibration pattern is not localized in a region of the boundary of the virtual object.

Optionally, driving the haptic device comprises providing an alternating current signal to a second electrode layer of the haptic device; wherein the haptic device comprises a plurality of units arranged along a first direction; and a respective unit of the plurality of units comprises a first electrode layer, an electroactive layer on the first electrode layer, and a second electrode layer on a side of the electroactive layer away from the first electrode layer.

BRIEF DESCRIPTION OF THE FIGURES

The following drawings are merely examples for illustrative purposes according to various disclosed embodiments and are not intended to limit the scope of the present invention.

FIG. 3B is a cross-sectional view of a first vibration pattern in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an electronic apparatus and a method of operating an electronic apparatus that substantially obviate one or more of the problems due to limitations and disadvantages of the related art. In one aspect, the present disclosure provides an electronic apparatus. In some embodiments, the electronic apparatus includes a touch control device configured to detect a position of a touch on a surface of the electronic apparatus; a haptic device configured to produce a vibration pattern on the surface; a driving circuit configured to drive the haptic device; a processor configured to determine in real time a relative position between the touch and a boundary zone of a virtual object, and upon determination that the position of the touch enters the boundary zone, transmit a first driving signal to the driving circuit. Optionally, upon receiving the first driving signal, the driving circuit is configured to drive the haptic device to produce a first vibration pattern having characteristics that simulate a boundary of the virtual object.

Figure 1:
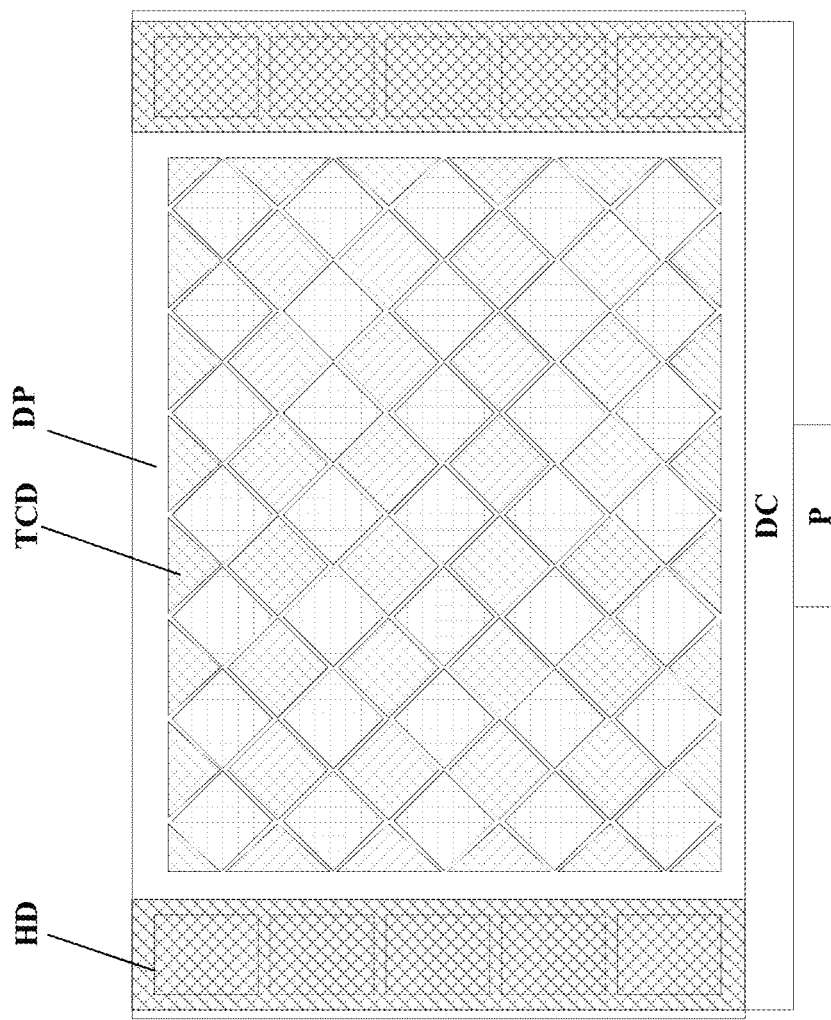
FIG. 1 is a schematic diagram illustrating the structure of an electronic apparatus in some embodiments according to the present disclosure.

FIG. 1 is a schematic diagram illustrating the structure of an electronic apparatus in some embodiments according to the present disclosure. Referring to FIG. 1, the electronic apparatus in some embodiments includes a touch control structure TCD which may include a touch electrode layer. Various appropriate touch control structures may be used in the present electronic apparatus. Examples of touch control structures include a mutual-capacitive type touch control structure and a self-capacitive type touch control structure. The touch control structure TCD is configured to detect a position of a touch on a surface of the electronic apparatus. The electronic apparatus in some embodiments further includes a processor P. The processor P is in communication with the touch control structure TCD. In some embodiments, the processor P is configured to derive touch information such as touch positions of the touch based on a touch signal detected by the touch control structure TCD. In some embodiments, the processor P is configured to determine in real time a relative position between the touch and a boundary zone of a virtual object, and upon determination that the position of the touch enters the boundary zone, transmit a first driving signal to a driving circuit.

In some embodiments, the electronic apparatus further includes a haptic device HD and a driving circuit DC. The driving circuit DC is configured to drive the haptic device HD to produce a vibration pattern on a surface of the electronic apparatus, for example, the same surface on which a touch is detected. The processor P is in communication with the driving circuit DC. As discussed above, the processor P is configured to transmit a first driving signal to a driving circuit DC, upon determination that the position of the touch enters the boundary zone. In some embodiments, upon receiving the first driving signal, the driving circuit DC is configured to drive the haptic device HD to produce a first vibration pattern having characteristics that simulate a boundary of the virtual object.

The processor P may include any appropriate processor or processors. Further, the processor P may include multiple cores for multi-thread or parallel processing. The processor P may execute sequences of computer program instructions to perform various processes. The storage medium may include memory modules, such as ROM, RAM, flash memory modules, and mass storages, such as CD-ROM and hard disk, etc. A storage medium may store computer programs for implementing various processes when the computer programs are executed by the processor P. For example, the storage medium may store computer programs for implementing various algorithms when the computer programs are executed by the processor P.

Figure 2:
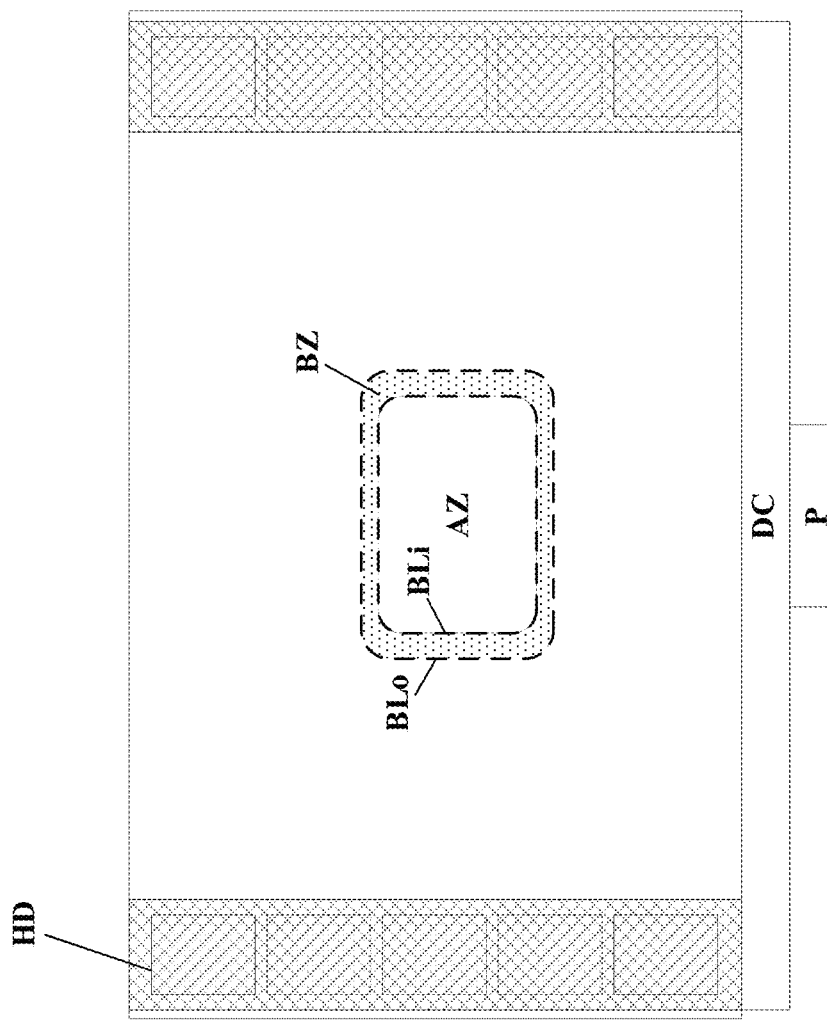
FIG. 2 illustrates a virtual object in some embodiments according to the present disclosure.

As used herein, the term "virtual object" refers to a computer-implemented representation of a physical object. For example, a virtual object may be an object that functionally represents (e.g., by touch control) a real device (e.g., a physical key in a physical keyboard) for input or output purposes. In another example, a virtual object may be a graphic object (e.g., a two-dimensional image, a holographic image, or a three-dimensional image) that visually represents a real device. In another example, a virtual object may be an object that functionally and visually represents a real device. The virtual object may be activatable or non-activatable. FIG. 2 illustrates a virtual object in some embodiments according to the present disclosure. Referring to FIG. 2, the virtual object in some embodiments has a boundary zone BZ which defines a boundary of the virtual object. In one example, when the virtual object is an activatable object, the bound zone BZ encircles an activatable zone AZ, as illustrated in FIG. 2. The boundary zone is defined by an inner boundary line BLi and an outer boundary line BLo. The inner boundary line BLi directly adjacent to the activatable zone AZ.

As discussed above, the touch control device is configured to detect a position of a touch on a surface of the electronic apparatus; and the processor is configured to determine in real time a relative position between the touch and a boundary zone BZ of a virtual object. Referring to FIG. 2, upon determination that the position of the touch (depicted as an index finger of a hand) enters the boundary zone BZ, the processor is configured to transmit a first driving signal to the driving circuit. Upon receiving the first driving signal, the driving circuit is configured to drive the haptic device to produce a first vibration pattern VP1 having characteristics that simulate a boundary of the virtual object.

Figure 3A:
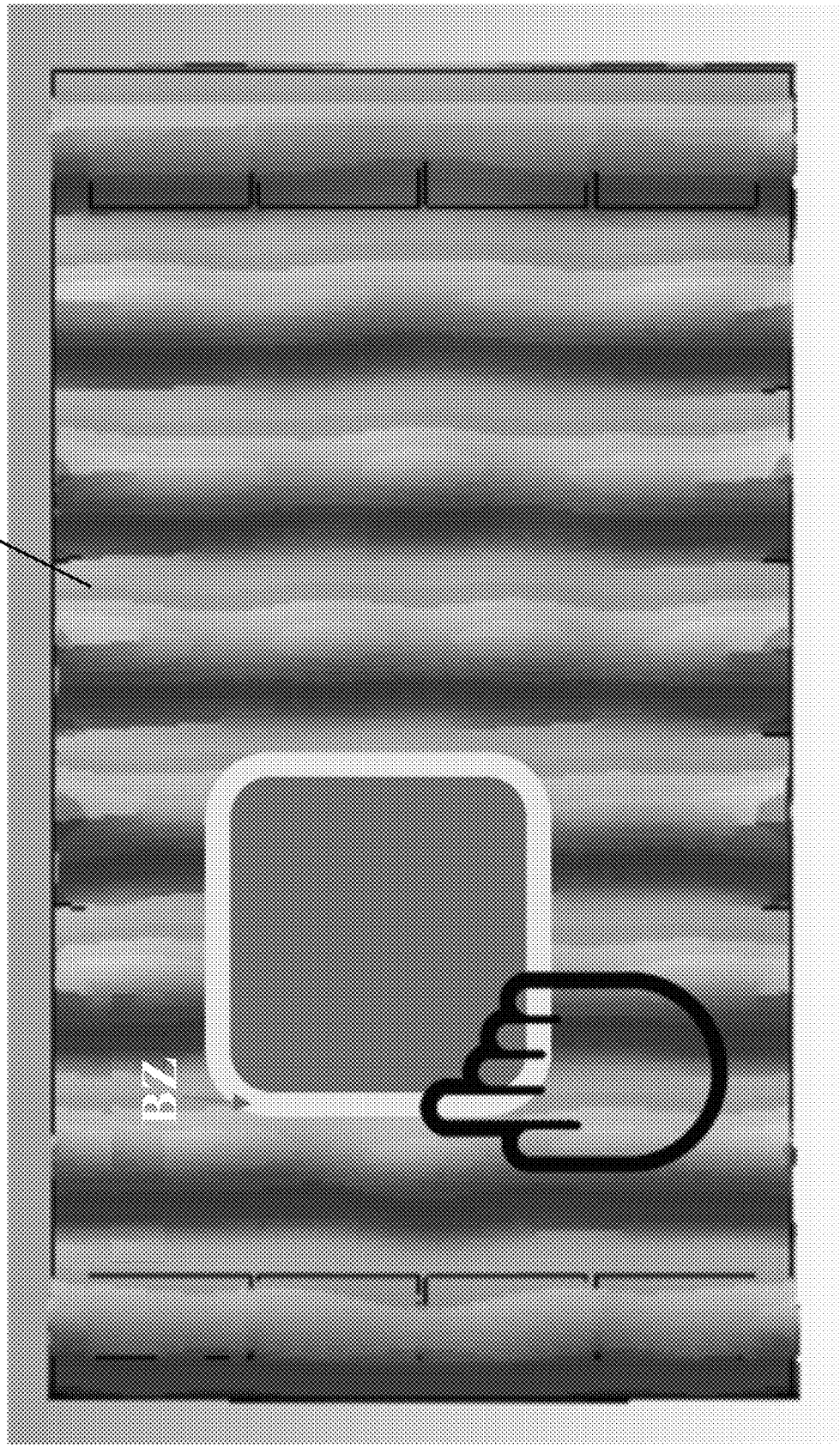
FIG. 3A is a plan view of a first vibration pattern in some embodiments according to the present disclosure.

FIG. 3A is a plan view of a first vibration pattern in some embodiments according to the present disclosure. FIG. 3B is a cross-sectional view of a first vibration pattern in some embodiments according to the present disclosure. Referring to FIG. 3A and FIG. 3B, in some embodiments, two adjacent anti-nodes (a first anti-node AN1 and a second anti-node AN2) of the first vibration pattern substantially overlap with an inner boundary line BLi and an outer boundary line Blo of the boundary zone BZ, respectively. Optionally, the first anti-node AN1 and the second anti-node AN2 have a phase different of 180 degrees. A node N immediately adjacent to the two adjacent anti-nodes (AN1 and AN2), and between the two adjacent anti-nodes, substantially overlaps with a middle line Lm of the boundary zone BZ. As used herein, the term "substantially overlap" refers to a position where the boundary line intersects with the vibration pattern is offset from an anti-node by a phase difference of no more than 20 degrees, e.g., no more than 15 degrees, no more than 10 degrees, no more than 5 degrees, no more than 4 degrees, no more than 3 degrees, no more than 2 degrees, no more than 1 degree, no more than 0.5 degree, no more than 0.1 degree, or zero degree. In one example, a position where the inner boundary line BLi intersects with the vibration pattern is offset from the first anti-node AN1 by a phase difference of no more than 20 degrees. In another example, a position where the outer boundary line BLo intersects with the vibration pattern is offset from the second anti-node AN2 by a phase difference of no more than 20 degrees. In another example, a position where the middle line Lm intersects with the vibration pattern is offset from the node N by a phase difference of no more than 20 degrees, e.g., no more than 15 degrees, no more than 10 degrees, no more than 5 degrees, no more than 4 degrees, no more than 3 degrees, no more than 2 degrees, no more than 1 degree, no more than 0.5 degree, no more than 0.1 degree, or zero degree.

In the context of the present disclosure, a node is a position of a vibration pattern where the surface or a medium does not vibrate or minimally vibrates; and anti-node is a position of the vibration pattern where the surface or the medium experiences maximal vibration when the haptic device is actuated to produce the vibration pattern.

Figure 4:
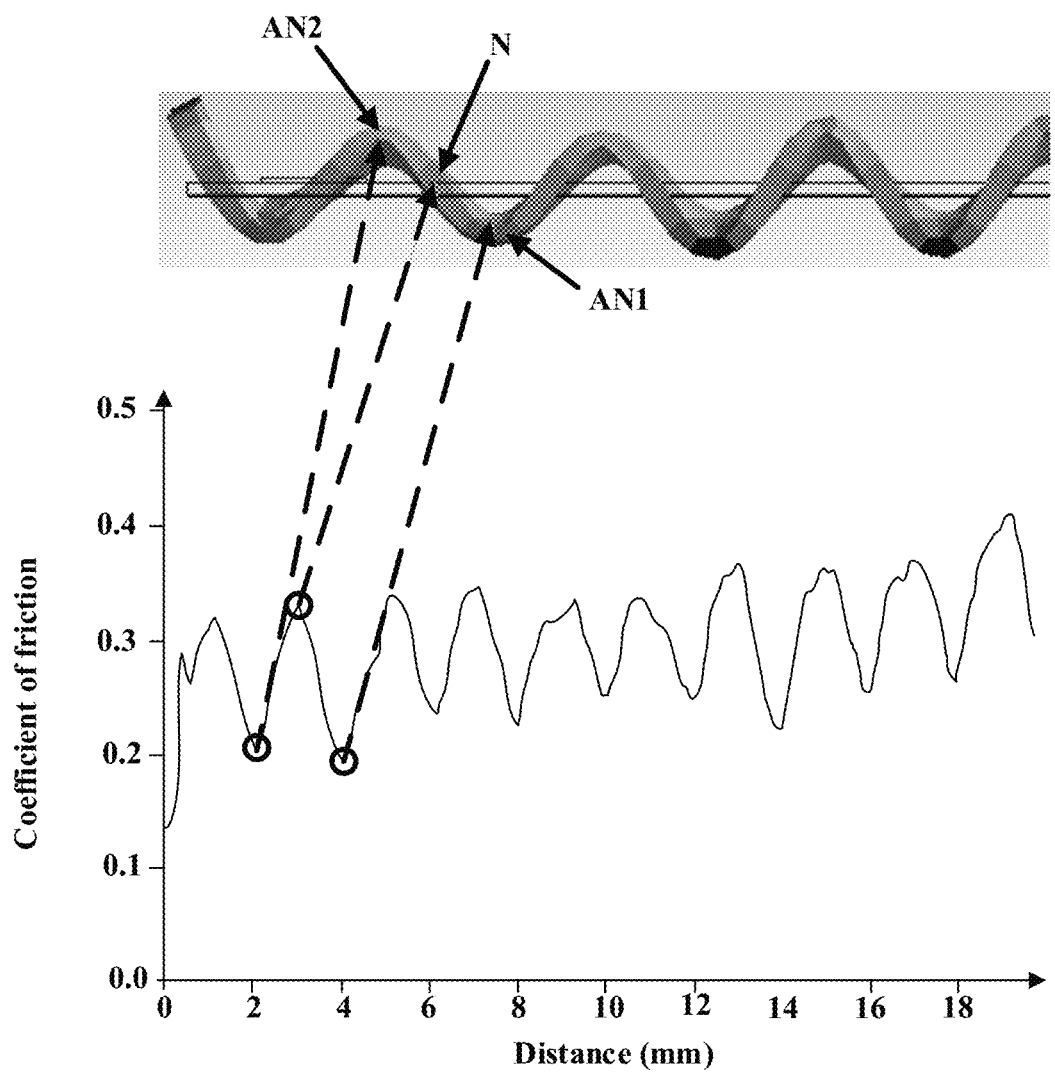
FIG. 4 illustrates coefficients of frictions at various positions in a first vibration pattern produced in an electronic apparatus in some embodiments according to the present disclosure.

The inventors of the present disclosure discover that the node N in the first vibration pattern has a relatively large coefficient of friction, whereas the anti-node in the first vibration pattern has a relatively small coefficient of friction, e.g., close to zero. In some embodiments, the first vibration pattern has a coefficient of friction at the node N greater than coefficients of friction at the two adjacent anti-nodes. FIG. 4 illustrates coefficients of frictions at various positions in a first vibration pattern produced in an electronic apparatus in some embodiments according to the present disclosure. Referring to FIG. 4, the node N in the first vibration pattern has a maximal coefficient of friction (peaks in the coefficient curve) whereas an anti-node (e.g., the first anti-node AN1 and the second anti-node AN2) has a minimal coefficient of friction (valleys in the coefficient curve).

The inventors discover that, surprisingly and unexpected, when a finger slides across the bound zone BZ as depicted in FIG. 3A and FIG. 3B, the differences between coefficients of friction respectively at the node N and the two adjacent anti-nodes simulate a real sense of "contacting" a boundary. As used herein, the term "coefficient of friction" refers to the resistance to tangential motion between two solid surfaces. For example, the coefficient of friction may be understood as the frictional force divided by the load applied to the two surfaces in contact.

Figure 5A:
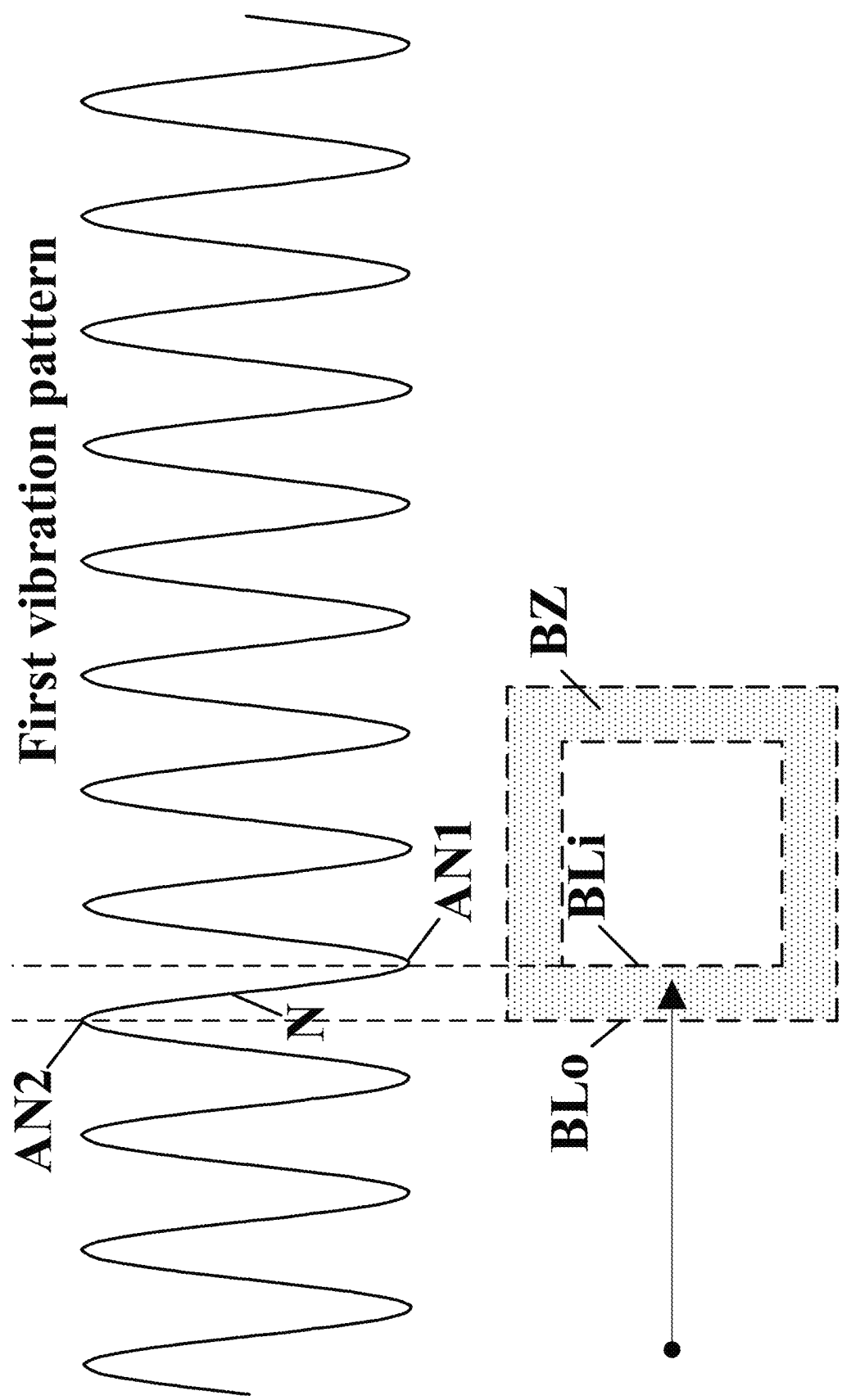
FIG. 5A illustrates a process of generating a first vibration pattern in an electronic apparatus in some embodiments according to the present disclosure.

FIG. 5A illustrates a process of generating a first vibration pattern in an electronic apparatus in some embodiments according to the present disclosure. Referring to FIG. 5A, when a finger slides from a region outside the virtual object (e.g., outside the boundary zone BZ) into the boundary zone BZ, the finger crosses over the outer boundary line BLo. The touch control device is configured to detect the position of the touch (finger) on the surface of the electronic device. The processor is configured to determine in real time a relative position between the touch and the boundary zone BZ of a virtual object. Upon determination that the position of the touch enters the boundary zone BZ, for example, crossing over the outer boundary line BLo but not yet crossing over the inner boundary line BLi, the processor is configured to transmit a first driving signal to the driving circuit. Upon receiving the first driving signal, the driving circuit is configured to drive the haptic device to produce a first vibration pattern having characteristics that simulate a boundary of the virtual object. Optionally, the first vibration pattern is not localized in a region of the boundary of the virtual object, e.g., not localized in the boundary zone BZ or not localized in a region surrounding the virtual object. Optionally, the first vibration pattern is globally applied in the electronic apparatus, for example, the first vibration pattern is produced in at least 50% (in at least 60%, in at least 70%, in at least 80%, in at least 90%, in at least 95%, or in at least 99%) of the surface of the electronic apparatus.

In an alternative example, the first vibration pattern is locally applied, e.g., in the region surrounding the virtual object, or in the boundary zone BZ.

Figure 5B:
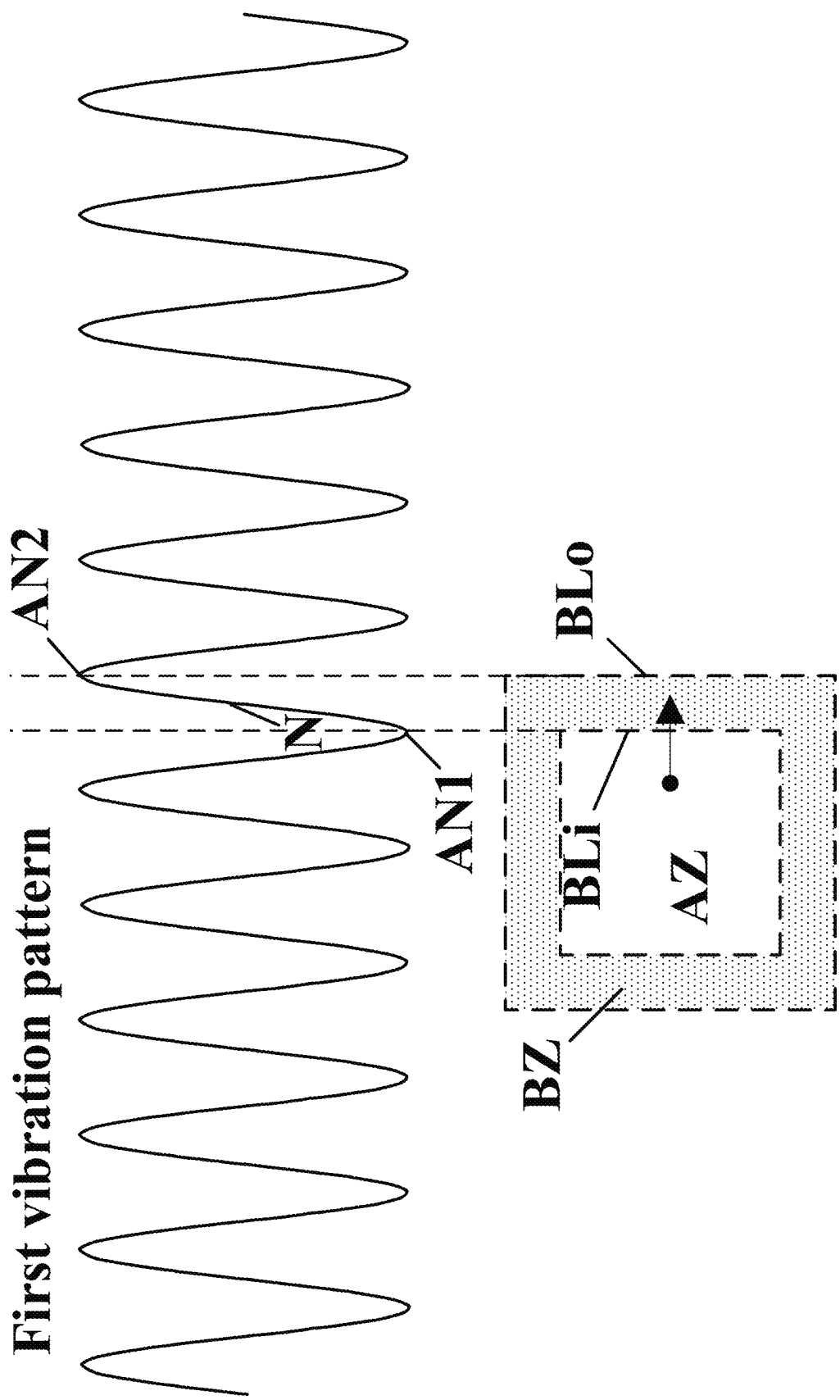
FIG. 5B illustrates a process of generating a first vibration pattern in an electronic apparatus in some embodiments according to the present disclosure.

FIG. 5B illustrates a process of generating a first vibration pattern in an electronic apparatus in some embodiments according to the present disclosure. Referring to FIG. 5B, when the finger slides from an inner region of the virtual object (e.g., an activatable zone AZ) into the boundary zone BZ, the finger crosses over the inner boundary line BLi. The touch control device is configured to detect the position of the touch (finger) on the surface of the electronic device. The processor is configured to determine in real time a relative position between the touch and the boundary zone BZ of a virtual object. Upon determination that the position of the touch enters the boundary zone BZ, for example, crossing over the inner boundary line BLi but not yet crossing over the outer boundary line BLo, the processor is configured to transmit the first driving signal to the driving circuit. Upon receiving the first driving signal, the driving circuit is configured to drive the haptic device to produce a first vibration pattern having characteristics that simulate a boundary of the virtual object. Optionally, the first vibration pattern is not localized in a region of the boundary of the virtual object, e.g., not localized in the boundary zone BZ or not localized in a region surrounding the virtual object. Optionally, the first vibration pattern is globally applied in the electronic apparatus, for example, the first vibration pattern is produced in at least 50% (in at least 60%, in at least 70%, in at least 80%, in at least 90%, in at least 95%, or in at least 99%) of the surface of the electronic apparatus.

In an alternative example, the first vibration pattern is locally applied, e.g., in the region surrounding the virtual object, or in the boundary zone BZ.

Figure 6:
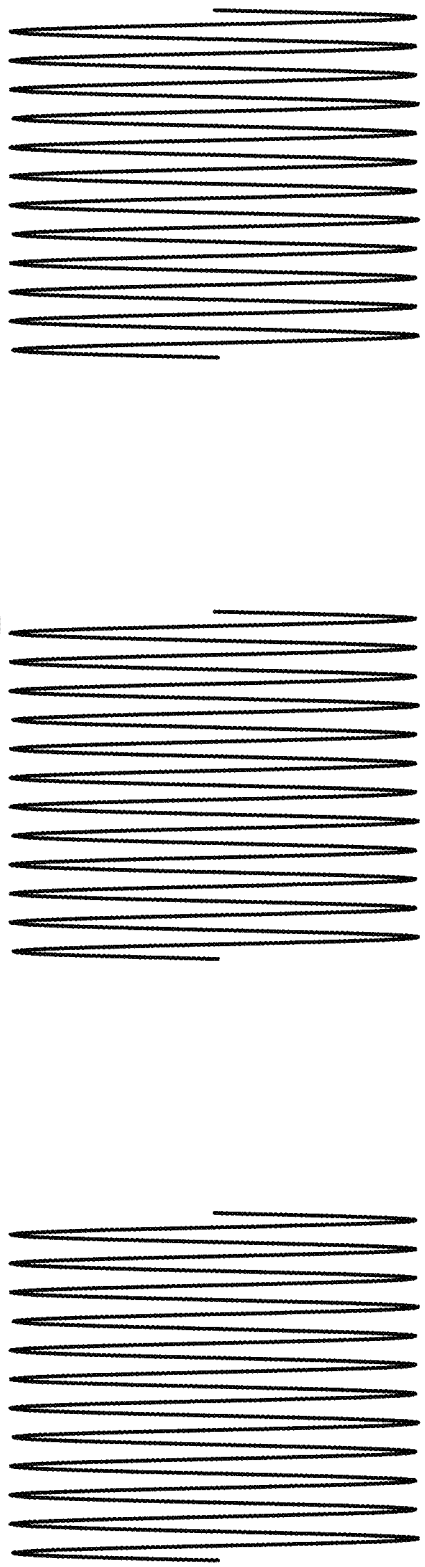
FIG. 6 illustrates a process of generating a second vibration pattern in an electronic apparatus in some embodiments according to the present disclosure.
Figure 6:
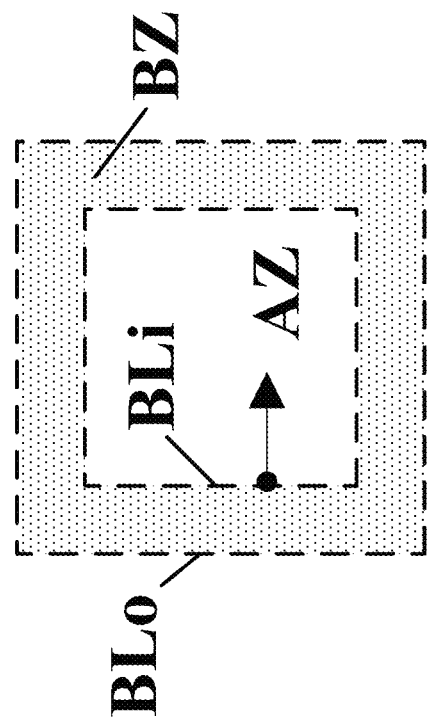

FIG. 6 illustrates a process of generating a second vibration pattern in an electronic apparatus in some embodiments according to the present disclosure. Referring to FIG. 6, when the finger slides from a boundary zone BZ into an inner region of the virtual object (e.g., an activatable zone AZ), the finger crosses over the inner boundary line BLi. The touch control device is configured to detect the position of the touch (finger) on the surface of the electronic device. The processor is configured to determine in real time a relative position between the touch and the activatable zone AZ of a virtual object. Upon determination that the position of the touch exits the boundary zone BZ and enters an activatable zone AZ of the virtual object, for example, crossing over the inner boundary line BLi into the activatable zone AZ, the processor is configured to transmit a second driving signal to the driving circuit. Upon receiving the second driving signal, the driving circuit is configured to drive the haptic device to produce a second vibration pattern different from the first vibration pattern. Optionally, the second vibration pattern is not localized in an inner region of the virtual object, e.g., not localized in the activatable zone AZ or not localized in a region surrounding the virtual object. Optionally, the second vibration pattern is globally applied in the electronic apparatus, for example, the second vibration pattern is produced in at least 50% (in at least 60%, in at least 70%, in at least 80%, in at least 90%, in at least 95%, or in at least 99%) of the surface of the electronic apparatus.

In an alternative example, the second vibration pattern is locally applied, e.g., in the region surrounding the virtual object, or in the activatable zone AZ.

In some embodiments, the second vibration pattern has a frequency higher than a frequency of the first vibration pattern. Optionally, the frequency of the second vibration pattern is higher than the frequency of the first vibration pattern by at least 50%, e.g., at least 50%, at least 60%, at least 70%, at least 80%, at least 90%, at least 100%, at least 150%, at least 200%, at least 250%, at least 300%, at least 350%, at least 400%, at least 450%, or at least 500%. The high frequency vibration pattern generates a surface haptic feedback, simulating a real sense of "touching" a top surface of a key.

In some embodiments, the virtual object discussed above is an object that functionally represents (e.g., by touch control) a real device (e.g., a physical key in a physical keyboard). In some embodiments, a display panel of the electronic apparatus is configured to display an object image representing the virtual object, the object image having a displayed boundary zone.

Optionally, the functional virtual object and the visually represented virtual object (e.g., the object image) overlap with each other in terms of their positions and occupied areas on the electronic apparatus.

Optionally, the functional virtual object and the visually represented virtual object (e.g., the object image) only partially overlap with each other in terms of their positions and occupied areas on the electronic apparatus.

Figure 7:
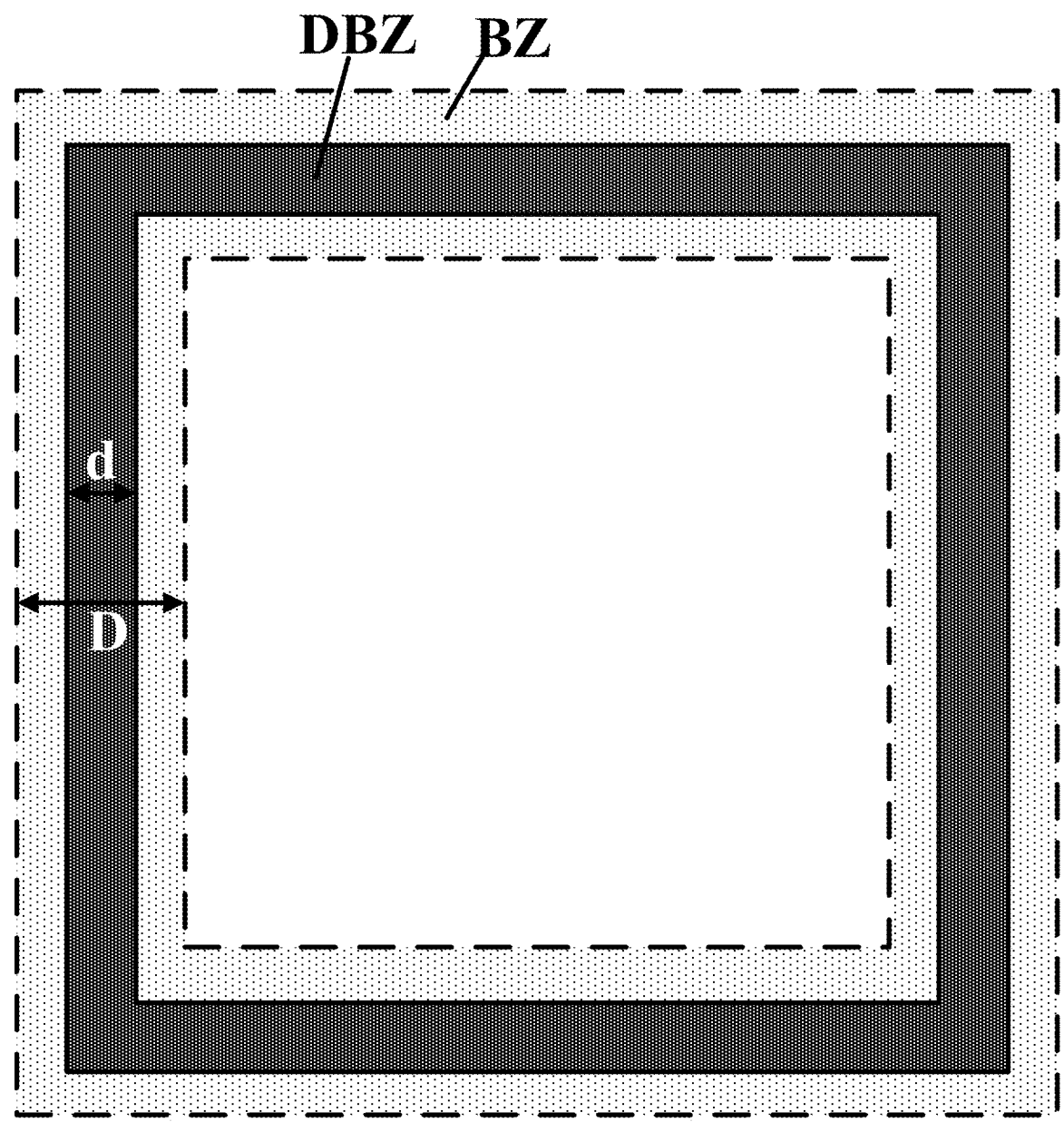
FIG. 7 illustrates a relation between a functional virtual object and a visual virtual object in some embodiments according to the present disclosure.

FIG. 7 illustrates a relation between a functional virtual object and a visual virtual object in some embodiments according to the present disclosure. Referring to FIG. 7, a boundary zone in a functional virtual object is depicted as BZ, and a display boundary zone in a visually represented virtual object is depicted as DBZ. A width of the boundary zone BZ is depicted as a distance D, which is a distance between an inner boundary line and an outer boundary line of the boundary zone BZ. A width of the display boundary zone DBZ is depicted as a distance d, which is a distance between an inner boundary line and an outer boundary line of the displayed boundary zone DBZ.

In some embodiments, the processor is further configured to determine in real time a sliding speed of the touch on the surface, and determining a distance between two adjacent anti-nodes of the first vibration pattern based on the speed and a distance between an inner boundary line and an outer boundary line of the displayed boundary zone. In one example, the distance between two adjacent anti-nodes of the first vibration pattern is substantially the same as the distance D in FIG. 7. In another example, the distance between an inner boundary line and an outer boundary line of the displayed boundary zone DBZ is substantially the same as the distance d in FIG. 7. Optionally, the distance between two adjacent anti-nodes of the first vibration pattern is greater than the distance between an inner boundary line and an outer boundary line of the displayed boundary zone, as shown in FIG. 7. In one example, when the sliding speed of the touch on the surface is greater than 10 mm per second, D=2d. As used herein, the term "substantially the same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value.

In some embodiments, the processor is further configured to determine in real time a sliding speed of the touch on the surface, and determining a distance between an inner boundary line and an outer boundary line of the displayed boundary zone based on the speed and a distance between two adjacent anti-nodes of the first vibration pattern.

Optionally, the distance D is in a range of 1 mm to 20 mm, e.g., 1 mm to 2 mm, 2 mm to 3 mm, 3 mm to 4 mm, 4 mm to 5 mm, 5 mm to 6 mm, 6 mm to 7 mm, 7 mm to 8 mm, 8 mm to 9 mm, 9 mm to 10 mm, 10 mm to 11 mm, 11 mm to 12 mm, 12 mm to 13 mm, 13 mm to 14 mm, 14 mm to 15 mm, 15 mm to 16 mm, 16 mm to 17 mm, 17 mm to 18 mm, 18 mm to 19 mm, or 19 mm to 20 mm.

Optionally, the distance d is in a range of 0.5 mm to 10 mm, e.g., 0.5 mm to 1 mm, 1 mm to 2 mm, 2 mm to 3 mm, 3 mm to 4 mm, 4 mm to 5 mm, 5 mm to 6 mm, 6 mm to 7 mm, 7 mm to 8 mm, 8 mm to 9 mm, or 9 mm to 10 mm.

Figure 8A:
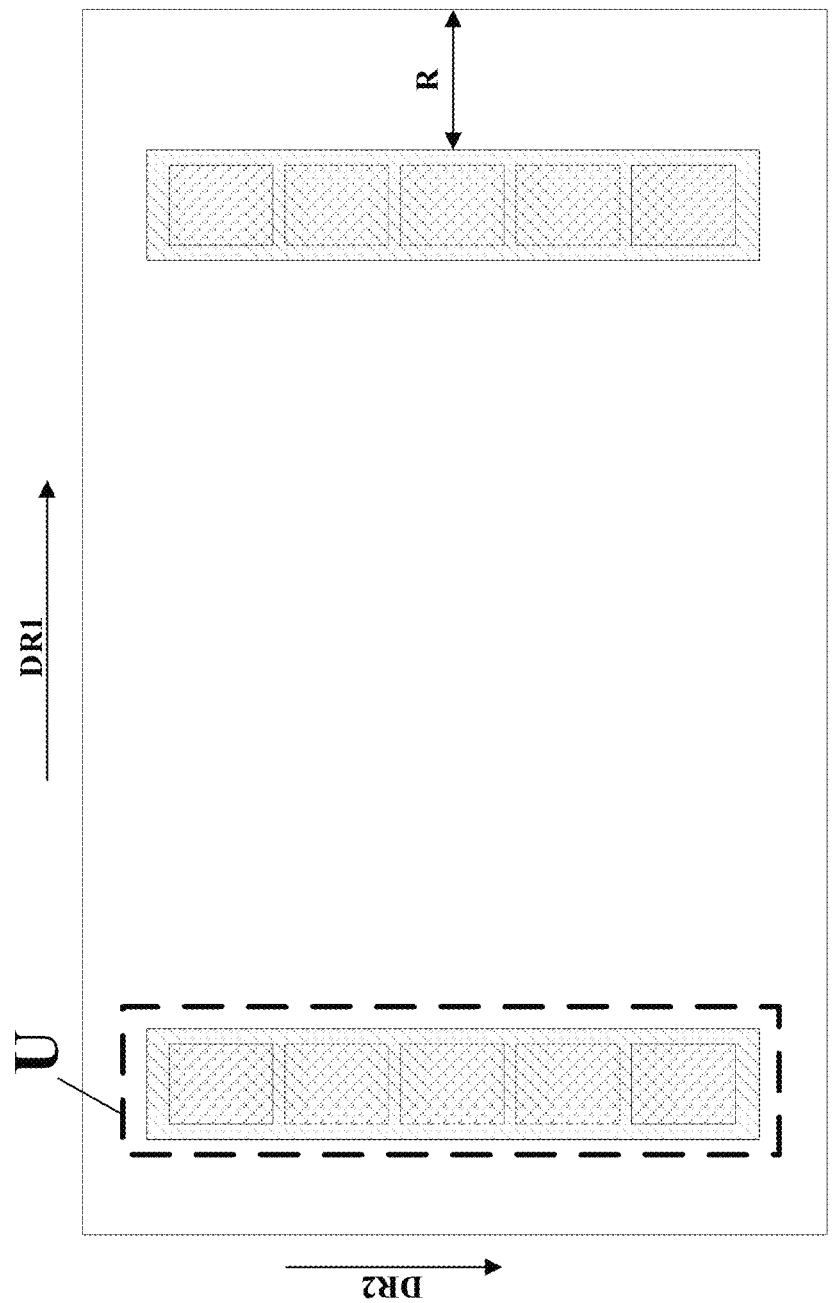
FIG. 8A is a schematic diagram illustrating the structure of a haptic device in some embodiments according to the present disclosure.
Figure 8B:
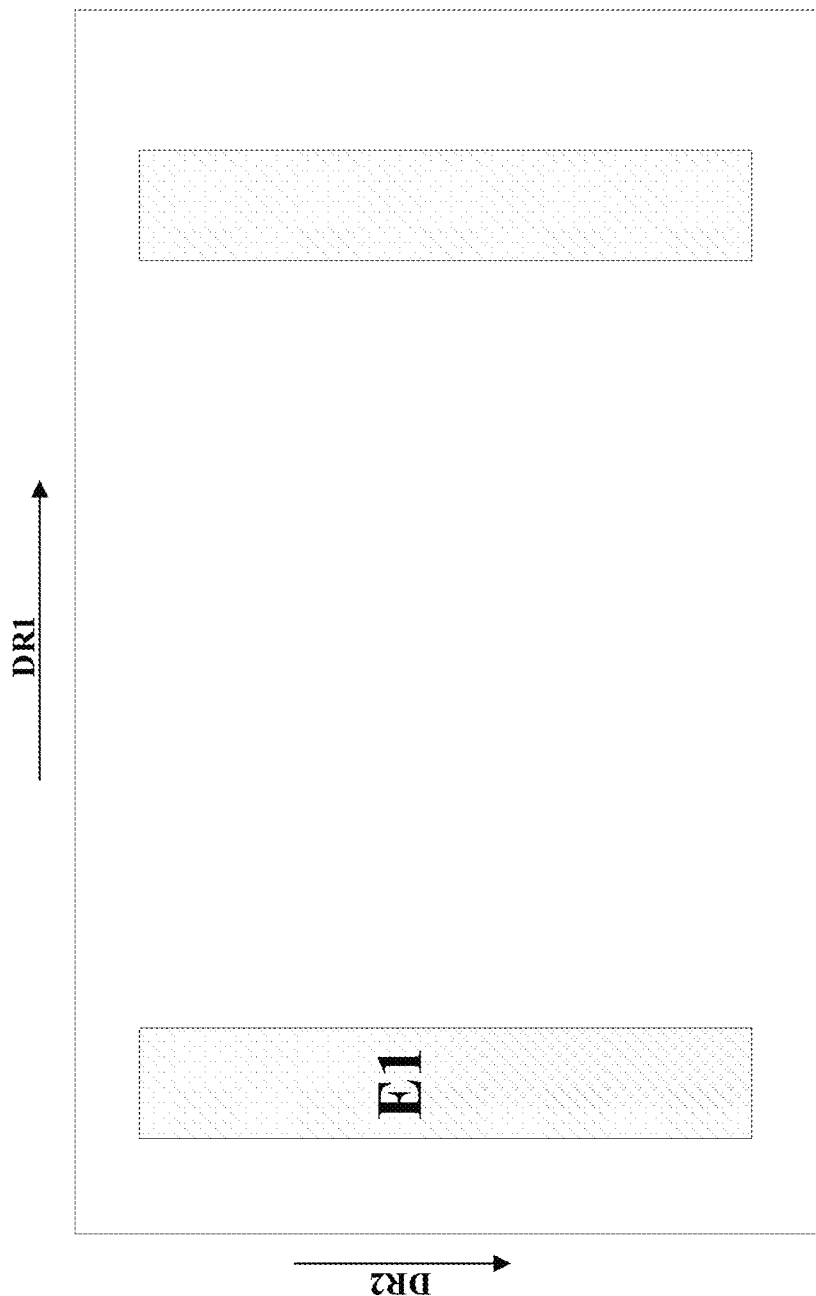
FIG. 8B is a schematic diagram illustrating the structure of a first electrode layer in a haptic device in some embodiments according to the present disclosure.
Figure 8C:
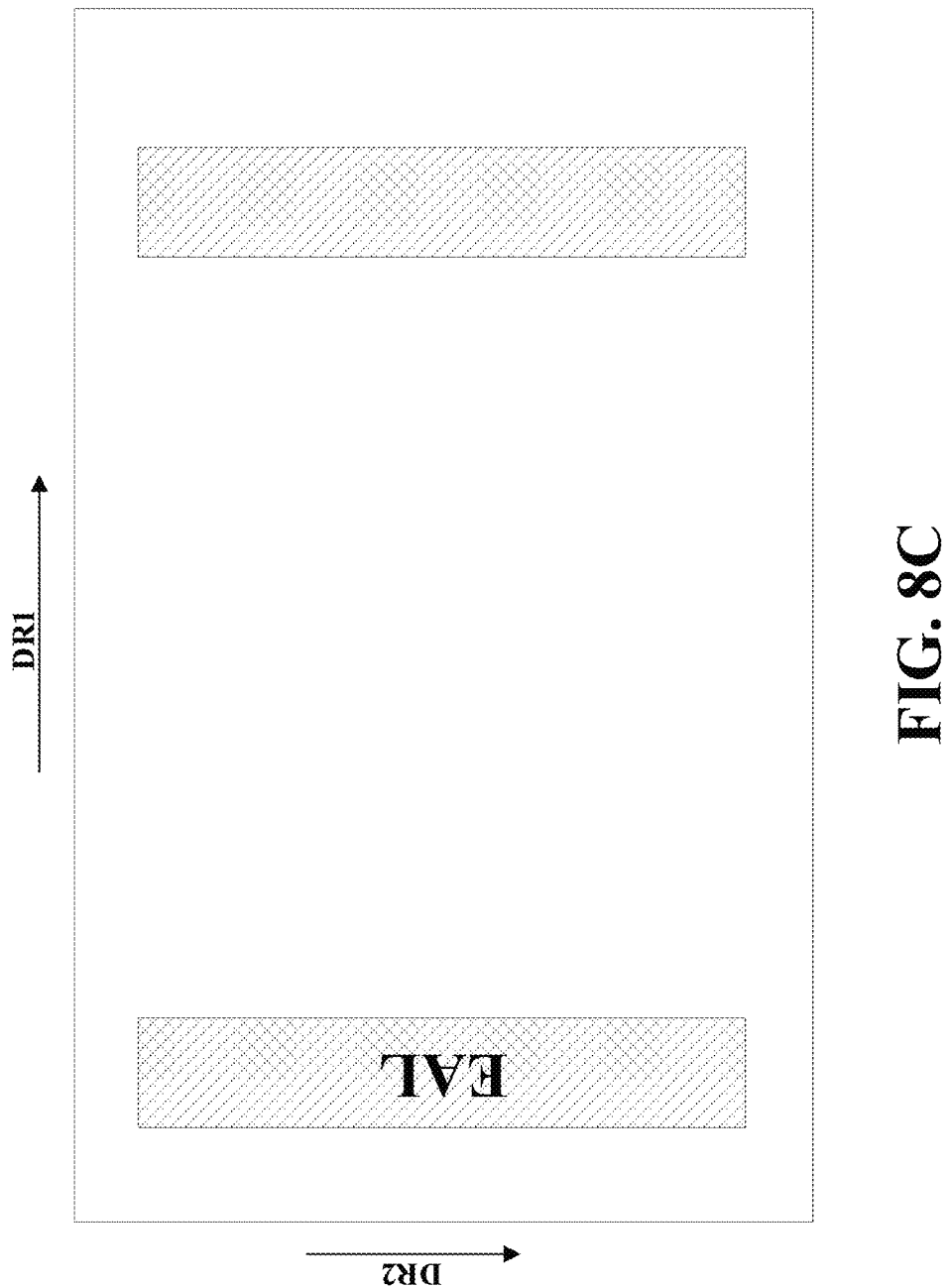
FIG. 8C is a schematic diagram illustrating the structure of an electroactive layer in a haptic device in some embodiments according to the present disclosure.
Figure 8D:
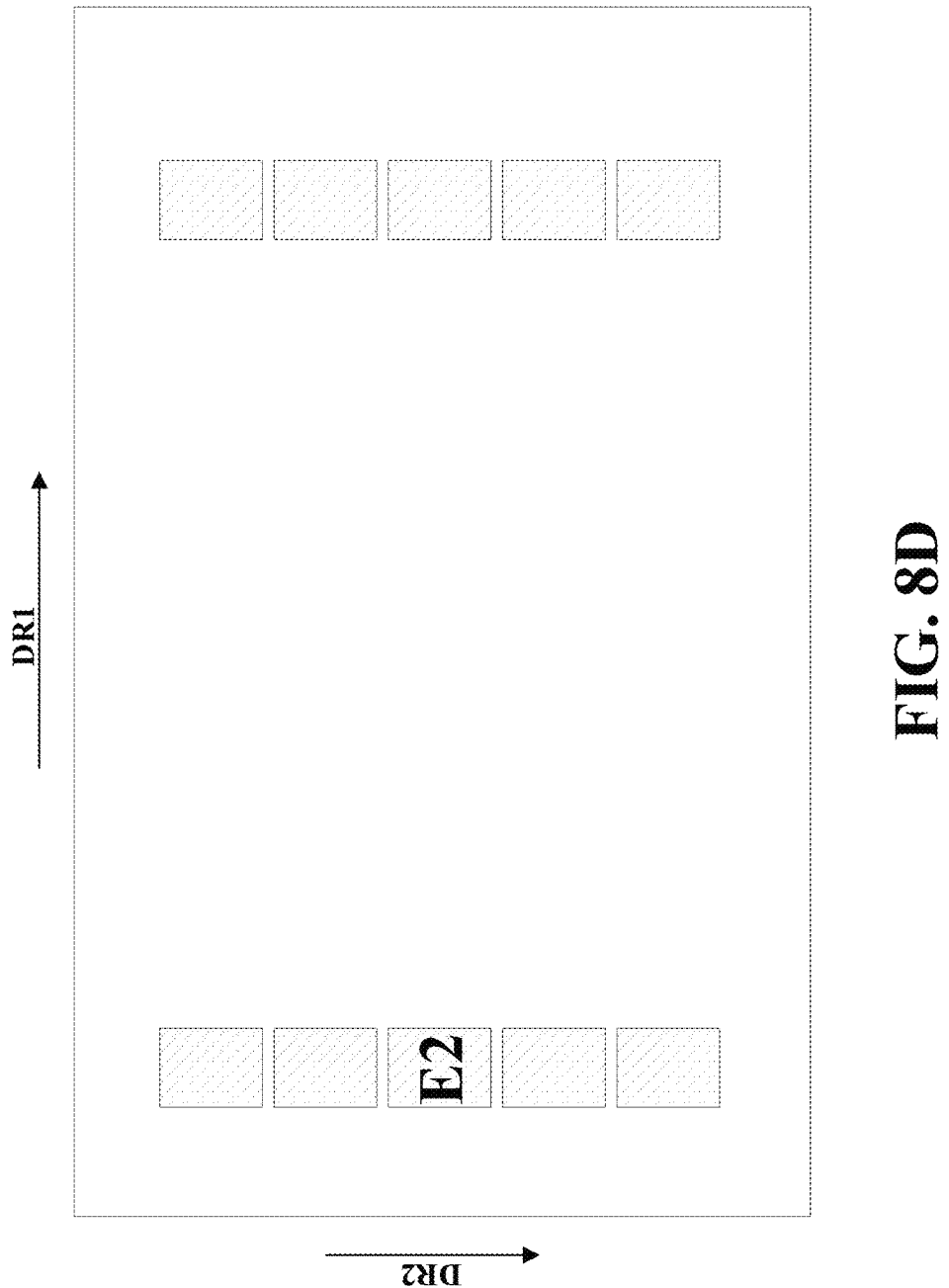
FIG. 8D is a schematic diagram illustrating the structure of a second electrode layer in a haptic device in some embodiments according to the present disclosure.

FIG. 8A is a schematic diagram illustrating the structure of a haptic device in some embodiments according to the present disclosure. Referring to FIG. 8A, the haptic device in some embodiments includes a plurality of units U arranged along a first direction DR1. FIG. 8B is a schematic diagram illustrating the structure of a first electrode layer in a haptic device in some embodiments according to the present disclosure. FIG. 8C is a schematic diagram illustrating the structure of an electroactive layer in a haptic device in some embodiments according to the present disclosure. FIG. 8D is a schematic diagram illustrating the structure of a second electrode layer in a haptic device in some embodiments according to the present disclosure. Referring to FIG. 8A to FIG. 8D, in some embodiments, a respective unit of the plurality of units U includes a first electrode layer E1, an electroactive layer EAL on the first electrode layer E1, and a second electrode layer E2 on a side of the electroactive layer EAL away from the first electrode layer E1. The electroactive layer EAL includes an electroactive material. When a voltage signal (e.g., an alternating current signal) is applied to the substrate (e.g., through the first electrode layer E1 and the second electrode layer E2), structural vibration is formed on a surface of the substrate, particularly when the alternating current signal having a resonant frequency is provided. When a finger is placed on the surface of the substrate, surface tactile friction control can be achieved. The amplitude of the vibration is positively correlated to the amplitude of the voltage signal provided.

As used herein the term "electroactive material" refers to a material that reversibly changes one or more characteristic body dimension by an amount depending on an applied electrical voltage. As used herein, the term "electroactive layer" refers to a layer in the present substrate that includes an electroactive material, and is capable of reversibly changing one or more characteristic body dimension by an amount depending on an applied electrical voltage. Optionally, the electroactive material is an electrostrictive material. Stress and strain response of the electrostrictive material to an electric field is proportional to the square of the electric field. Optionally, the electroactive material is a piezoelectric material. Stress and strain response of the piezoelectric material to an electric field is proportional to the electric field.

Any appropriate electrostrictive material may be used for making the electroactive layer, e.g., electrostrictive ceramics, electrostrictive polymers, electrostrictive valves, etc. Examples of appropriate electrostrictive materials include, but are not limited to, a polyurethane containing material (e.g., a doped polyurethane material), polyvinylidene fluoride, lead magnesium niobate, lead magnesium niobate-lead titanate, lanthanum doped lead zirconate titanate, barium doped lead zirconate titanate, and various substitutes and derivatives thereof (e.g., doped with one or more dopant).

Any appropriate piezoelectric material may be used for making the electroactive layer. Examples of appropriate piezoelectric materials include, but are not limited to, lead zirconium titanate, berlinite, zinc oxide, barium titanate, lead titanate, and various substitutes and derivatives thereof (e.g., doped with one or more dopant).

Referring to FIG. 8A, in one example, by adjusting a distance R between a respective unit (e.g., the unit on the right side of the electronic apparatus) of the plurality of units U and an edge of the electronic apparatus, vibration patterns of different frequencies and/or different amplitudes may be obtained. Table 1 summarizes frequencies/amplitudes of various vibration patterns obtained by adjusting the distance R.

TABLE 1

Frequencies and amplitudes of various vibration patterns obtained at different R values.

| R (mm) | Amplitude (μm) | Frequency (Hz) |
|---|---|---|
| 5 | $1.98 \times 10^{-6}$ | 25300 |
| 6 | $1.93 \times 10^{-6}$ | 25100 |
| 7 | $1.60 \times 10^{-6}$ | 24900 |
| 8 | $1.28 \times 10^{-6}$ | 24800 |
| 9 | $1.25 \times 10^{-6}$ | 28000 |
| 10 | $1.51 \times 10^{-6}$ | 28100 |
| 11 | $1.78 \times 10^{-6}$ | 21800 |
| 12 | $1.93 \times 10^{-6}$ | 21900 |
| 13 | $1.93 \times 10^{-6}$ | 22000 |

Examples of appropriate electronic apparatuses include, but are not limited to, an electronic paper, a mobile phone, a tablet computer, a television, a monitor, a notebook computer, a digital album, a GPS, etc. Optionally, the display panel in the electronic apparatus is an organic light emitting diode display panel. Optionally, the display panel is a liquid crystal display panel.

Figure 9:
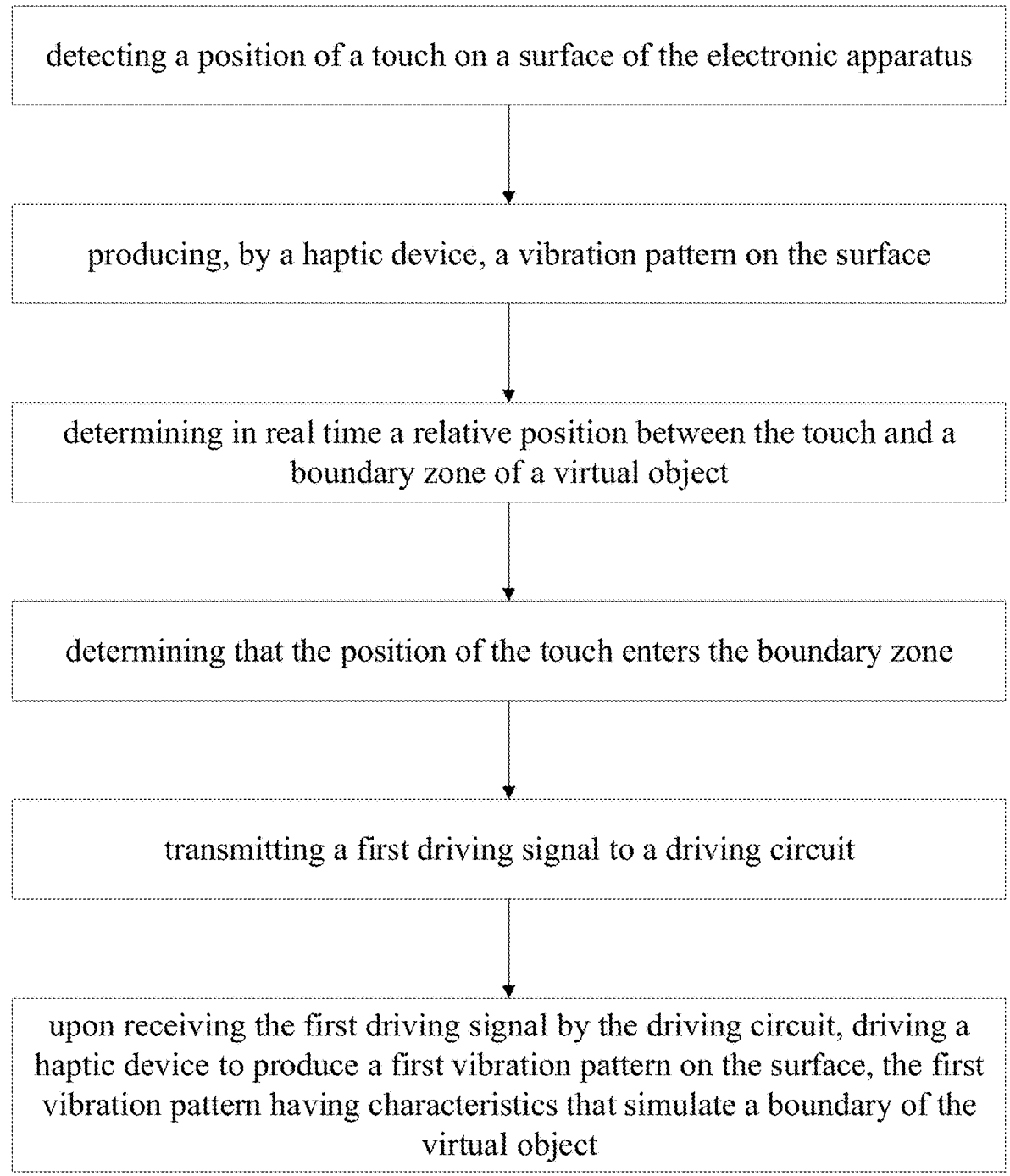
FIG. 9 is a flow chart illustrate a method of operating an electronic apparatus in some embodiments according to the present disclosure.

In another aspect, the present disclosure provides a method of operating an electronic apparatus. FIG. 9 is a flow chart illustrate a method of operating an electronic apparatus in some embodiments according to the present disclosure. Referring to FIG. 9, the method in some embodiments includes detecting a position of a touch on a surface of the electronic apparatus; producing, by a haptic device, a vibration pattern on the surface; determining in real time a relative position between the touch and a boundary zone of a virtual object; determining that the position of the touch enters the boundary zone; transmitting a first driving signal to a driving circuit; and upon receiving the first driving signal by the driving circuit, driving a haptic device to produce a first vibration pattern on the surface, the first vibration pattern having characteristics that simulate a boundary of the virtual object.

In some embodiments, two adjacent anti-nodes of the first vibration pattern substantially overlap with an inner boundary line and an outer boundary line of the boundary zone, respectively.

In some embodiments, the first vibration pattern further includes a node immediately adjacent to the two adjacent anti-nodes. Optionally, the two adjacent anti-nodes have a phase difference of 180 degrees.

In some embodiments, the first vibration pattern has a coefficient of friction at the node greater than coefficients of friction at the two adjacent anti-nodes.

In some embodiments, the method further includes determining that the position of the touch exits the boundary zone and enters an activatable zone of the virtual object; transmitting a second driving signal to the driving circuit; and driving the haptic device to produce a second vibration pattern different from the first vibration pattern.

In some embodiments, the second vibration pattern has a frequency higher than a frequency of the first vibration pattern.

In some embodiments, the method further includes displaying an object image representing the virtual object, the object image having a displayed boundary zone; determining in real time a sliding speed of the touch on the surface; and determining a distance between two adjacent anti-nodes of the first vibration pattern based on the speed and a distance between an inner boundary line and an outer boundary line of the displayed boundary zone.

In some embodiments, the distance between two adjacent anti-nodes of the first vibration pattern is greater than the distance between an inner boundary line and an outer boundary line of the displayed boundary zone.

In some embodiments, the first vibration pattern is not localized to a region of the boundary of the virtual object.

In some embodiments, driving the haptic device includes providing an alternating current signal to a second electrode layer of the haptic device. Optionally, the haptic device comprises a plurality of units arranged along a first direction. Optionally, a respective unit of the plurality of units includes a first electrode layer, an electroactive layer on the first electrode layer, and a second electrode layer on a side of the electroactive layer away from the first electrode layer.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An electronic apparatus, comprising:
a touch control device configured to detect a position of a touch on a surface of the electronic apparatus;
a haptic device configured to produce a vibration pattern on the surface;
a driving circuit configured to drive the haptic device;
a processor configured to determine in real time a relative position between the touch and a boundary zone of a virtual object, and upon determination that the position of the touch enters the boundary zone, transmit a first driving signal to the driving circuit; and
a display panel configured to display an object image representing the virtual object, the object image having a displayed boundary zone;
wherein, upon receiving the first driving signal, the driving circuit is configured to drive the haptic device to produce a first vibration pattern having characteristics that simulate a boundary of the virtual object; and
the processor is further configured to determine in real time a sliding speed of the touch on the surface, and determining a distance between two adjacent anti-nodes of the first vibration pattern based on the sliding speed and a distance between an inner boundary line and an outer boundary line of the displayed boundary zone.

2. The electronic apparatus of claim 1, wherein two adjacent anti-nodes of the first vibration pattern substantially overlap with an inner boundary line and an outer boundary line of the boundary zone, respectively.

3. The electronic apparatus of claim 2, wherein the first vibration pattern further includes a node immediately adjacent to the two adjacent anti-nodes; and
the two adjacent anti-nodes have a phase difference of 180 degrees.

4. The electronic apparatus of claim 3, wherein the first vibration pattern has a coefficient of friction at the node greater than coefficients of friction at the two adjacent anti-nodes.

5. The electronic apparatus of claim 1, wherein, upon determination that the position of the touch exits the boundary zone and enters an activatable zone of the virtual object, the processor is configured to transmit a second driving signal to the driving circuit; and
upon receiving the second driving signal, the driving circuit is configured to drive the haptic device to produce a second vibration pattern different from the first vibration pattern.

6. The electronic apparatus of claim 5, wherein the second vibration pattern has a frequency higher than a frequency of the first vibration pattern.

7. The electronic apparatus of claim 1, wherein the distance between two adjacent anti-nodes of the first vibration pattern is greater than the distance between an inner boundary line and an outer boundary line of the displayed boundary zone.

8. The electronic apparatus of claim 1, wherein the first vibration pattern is not localized in a region of the boundary of the virtual object.

9. The electronic apparatus of claim 1, wherein the haptic device comprises a plurality of units arranged along a first direction; and
a respective unit of the plurality of units comprises a first electrode layer, an electroactive layer on the first electrode layer, and a second electrode layer on a side of the electroactive layer away from the first electrode layer.

10. A method of operating an electronic apparatus, comprising:
detecting a position of a touch on a surface of the electronic apparatus;
producing, by a haptic device, a vibration pattern on the surface;
determining in real time a relative position between the touch and a boundary zone of a virtual object;
determining that the position of the touch enters the boundary zone;
transmitting a first driving signal to a driving circuit;
upon receiving the first driving signal by the driving circuit, driving a haptic device to produce a first vibration pattern on the surface, the first vibration pattern having characteristics that simulate a boundary of the virtual object;
displaying an object image representing the virtual object, the object image having a displayed boundary zone;

determining in real time a sliding speed of the touch on the surface; and determining a distance between two adjacent anti-nodes of the first vibration pattern based on the sliding speed and a distance between an inner boundary line and an outer boundary line of the displayed boundary zone.

11. The method of claim 10, wherein two adjacent anti-nodes of the first vibration pattern substantially overlap with an inner boundary line and an outer boundary line of the boundary zone, respectively.

12. The method of claim 11, wherein the first vibration pattern further includes a node immediately adjacent to the two adjacent anti-nodes; and the two adjacent anti-nodes have a phase difference of 180 degrees.

13. The method of claim 12, wherein the first vibration pattern has a coefficient of friction at the node greater than coefficients of friction at the two adjacent anti-nodes.

14. The method of claim 10, further comprising:

determining that the position of the touch exits the boundary zone and enters an activatable zone of the virtual object;

transmitting a second driving signal to the driving circuit; and driving the haptic device to produce a second vibration pattern different from the first vibration pattern.

15. The method of claim 14, wherein the second vibration pattern has a frequency higher than a frequency of the first vibration pattern.

16. The method of claim 10, wherein the distance between two adjacent anti-nodes of the first vibration pattern is greater than the distance between an inner boundary line and an outer boundary line of the displayed boundary zone.

17. The method of claim 10, the first vibration pattern is not localized in a region of the boundary of the virtual object.

18. The method of claim 10, wherein driving the haptic device comprises providing an alternating current signal to a second electrode layer of the haptic device;

wherein the haptic device comprises a plurality of units arranged along a first direction; and a respective unit of the plurality of units comprises a first electrode layer, an electroactive layer on the first electrode layer, and a second electrode layer on a side of the electroactive layer away from the first electrode layer.

* * * * *